April 1, 1930.　　　　R. V. MATTISON　　　　1,752,307
PLASTIC ARTICLE
Original Filed March 6, 1926　　5 Sheets-Sheet 1

Inventor
Richard V. Mattison
By his Attorneys
Edwards, Lager & Bower.

April 1, 1930.  R. V. MATTISON  1,752,307
PLASTIC ARTICLE
Original Filed March 6, 1926  5 Sheets-Sheet 2

April 1, 1930.  R. V. MATTISON  1,752,307
PLASTIC ARTICLE
Original Filed March 6, 1926   5 Sheets-Sheet 4

Inventor
Richard V. Mattison
By his Attorneys
Edwards, Sager & Bower

April 1, 1930.  R. V. MATTISON  1,752,307
PLASTIC ARTICLE
Original Filed March 6, 1926  5 Sheets-Sheet 5

Inventor
Richard V. Mattison
By his Attorneys
Edmunds, Lager + Bower

Patented Apr. 1, 1930

1,752,307

UNITED STATES PATENT OFFICE

RICHARD V. MATTISON, OF AMBLER, PENNSYLVANIA, ASSIGNOR TO AMBLER ASBESTOS COMPANY, A CORPORATION OF PENNSYLVANIA

PLASTIC ARTICLE

Original application filed March 6, 1926, Serial No. 92,730. Divided and this application filed December 22, 1926. Serial No. 156,423.

This invention relates to an article made of plastic material such as absestos-fibre composition and to a method and apparatus for producing the article.

Hitherto such plastic compositions have been worked into shingles, plates, slabs and the like of flat, even form, but it is often desirable that the shape or thickness of the article be varying or irregular, as for instance, in the case of shingles, where it is advantageous to have a taper in the long direction from thinness at one end to relative thickness at the other. The exposed ends of the shingles are thus increased in thickness without adding greatly to the thickness of the overlaid portions and the shingle has greater strength and durability and imparts a less flat and more desirable appearance to the roof as a whole. It is also often advantageous in appearance to give to the exposed portion of the shingle a roughened, irregular form and avoid the usual plain, straight-line effects. With the shingle of this invention the thickened end lends itself readily to this roughening effect when desired and is adapted to provide the extra material for irregular edging and surfacing.

The object of this invention is to provide a shingle or the like of irregular or tapered form and which may be roughened to give a desired final effect. A further object of the invention is to provide a method and apparatus for producing the article from plastic material.

A further object is to provide improved means whereby the general outline of each article may be effected while the machine is in continuous operation. A more specific object of the invention is to provide improved vacuum means for forming the article into substantially the desired shape whatever it may be, and to provide the article with a very dense resistant surface.

A further object is to provide means for separating the formed article from the forming mechanism and for conveying the formed article in its plastic state after being discharged from the forming mechanism. Other objects are to provide means for compressing the plastic article, and to provide improved means for scoring, or otherwise marking, the surface thereof should this be desired.

A further object of my invention is to provide an improved composition for forming such articles, which consists generally of asbestos fibre, hydraulic cement, sand, preferably sharp white sand, and water, preferably warm. When suitably mixed, this composition forms a jelly-like substance, consisting of small globules of colloidal cement and fibres. In order to obtain the best results the fibres must be forced into these small globules, and this is accomplished to a certain extent not only by the final pressing rolls, but by my improved machine this action is somewhat initially obtained by the suction action and also by the pressing rollers and belt which cooperate with the drum periphery. I have found that this composition not only produces a strong durable shingle of this type at low cost, but is also particularly adaptable to be formed into the desired shingle automatically by depositing a wet mixture or slurry onto a moving belt.

In addition to the foregoing objects, other objects of my invention are to provide certain novel features of construction and arrangement of parts which will be more apparent from the following description of the accompanying drawings in which—

Figures 1, 13, 14:
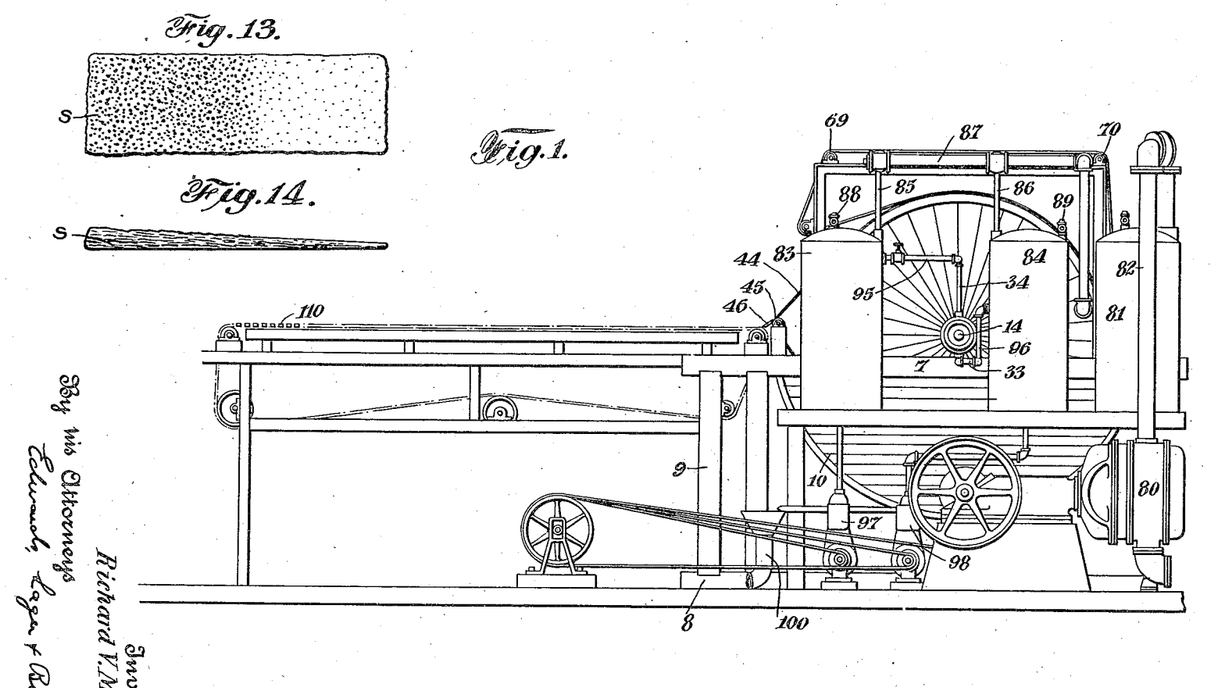
Fig. 1 is a side elevation of the shingle forming mechanism and the conveyor for transferring the same to other mechanism not shown.
Fig. 13 is a plan view of one form of a completed plate constructed by applicant's machine.
Fig. 14 is a side view of the completed plate shown in Fig. 13.

In the illustrative embodiment of my invention I have shown in Fig. 1 a suitable frame structure including a pair of parallel side members 7, a pair of parallel floor members 8 and vertical supports 9. Other members for supporting and bracing purposes may be included so as to suitably support a slurry tank 10. This tank has an arcuate bottom and vertical sides so as to form an opening 11 in the top and has an overflow pipe 12 disposed at one edge. For the purpose of agitating and mixing the slurry in the tank 10 there is provided a series of rotatable agitators 13, each being provided with a series of radial arms. These agitators may be rotated by any suitable mechanism, such as by an individual or continuous belt or suitable gears. It will also be understood that the tank 10 is made of such material which will be best suited to the nature of the slurry used. The slurry preferably consists of the elements in proportions as previously noted.

Figure 4:
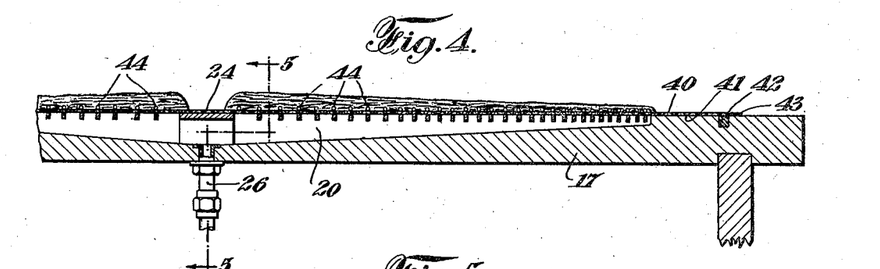
Fig. 4 is a section from the periphery of the drum showing the filtering cloth and cords thereon, this section being taken substantially parallel to the drum axis, as for instance, on line 4—4 of Fig. 2.
Figure 5:
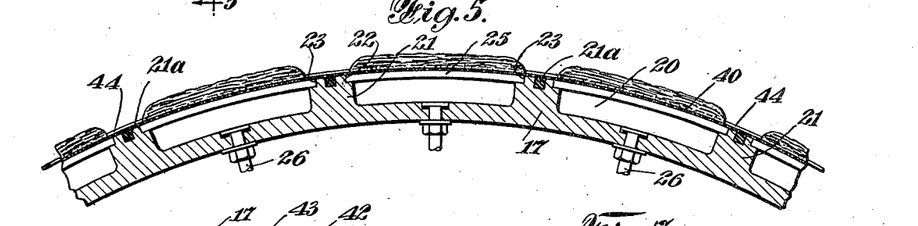
Fig. 5 is a fragmentary circumferential sectional view of the drum periphery and taken substantially on the lines 5—5 of Fig. 4.
Figure 6:
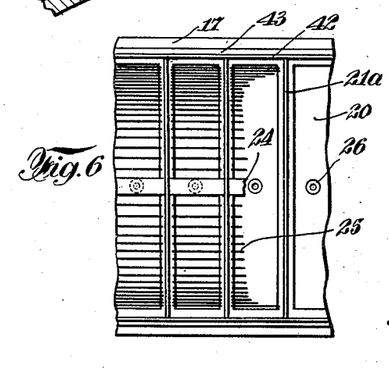
Fig. 6 is a fragmentary plan view of the drum periphery with the filtering cloth and cords removed.
Figure 7:
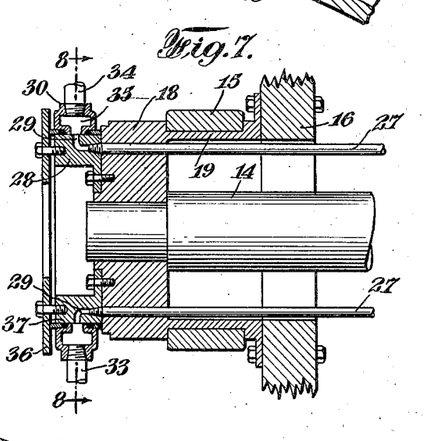
Fig. 7 is an axial section through the vac-
Figure 8:
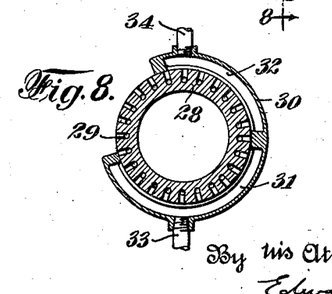
Fig. 8 is a section of the valve mechanism taken substantially on the lines 8—8 of Figs. 2 and 7.

In order to form the slurry into suitable articles, such as flat plates or slabs or of various pieces of product such as shingles, preferably tapered, there is provided a relatively large drum D, which is mounted upon a transverse shaft 14. This shaft is rotatably supported in bearings 15 that are supported by the side frame members 7. More specifically, this drum comprises, as shown in Figs. 4 to 8, side members 16 and a peripheral portion 17. The peripheral portion could be formed of any suitable material, such as wood, metal or the like. Fixed to each of the side members 16 is a bearing support 18, which has engagement with a reduced end of the shaft 14, the member 18 having an annular groove 19 to receive the bearing 15. The drum periphery is provided with a series of parallel substantially rectangular chambers 20. Each chamber is separated by an axially extending partition 21, which has recesses 22 and 23, and a central recess which receives a sealing strip 21ª, preferably made of rubber and extending beyond the ends of the chambers 20 as indicated in Fig. 6. A ported supporting rib 24 extends circumferentially of the drum and is intermediate the ends of the chambers 20, thereby forming in effect two chambers. It will be noted that the bottom of each chamber 20 inclines upwardly toward the drum periphery from the central portion adjacent the support 24. Bars 25 extending circumferentially of the drum are supported in the recesses 22 and 23. These bars, it will be noted, are successively spaced closer together as the outer sides of the drum periphery are reached, the purpose of which will appear in the description of the operation. Communicating with each chamber substantially adjacent the supporting rib 24 is a vacuum pipe 26, which extends radially within the drum and has a lateral extension 27, which passes through the supporting hub 18 and is secured in a hollow flanged member 28. The member 28 is suitably secured to the hub 18 and has an angular passage 29 leading to its periphery, thereby allowing communication between a vacuum controlling member 30 and the pipe 27. As shown in Fig. 8, the member 30 is stationary and only partially surrounds the periphery of the member 28. The member 30 is divided into a minimum vacuum chamber 31 and a maximum vacuum chamber 32, pressure therein being transmitted through pipes 33 and 34 respectively. Each of the chambers has an arcuate groove 35 that communicates with the passages 29. A plate 36 is secured to the member 28 to hold the valve member 30 in operative relation to the member 28, and to prevent air leakage between the adjacent surface suitable packing 37 is provided.

From the above it will be seen that as the drum rotates each chamber 20 will be subjected to a minimum vacuum of say ten pounds when the passage 29 is in communication with the chamber 31. Upon further rotation of the drum the passage 29 will be brought into communication with the chamber 32, and thereby allow a higher degree of vacuum to be formed in the drum chambers 20. Before completing one rotation of the drum the passage 29 will communicate with the atmosphere, as clearly indicated in Fig. 8.

The object of this vacuum controlled mechanism is to permit the drum to pick up or have accumulated on its periphery a substantially predetermined amount of slurry from the tank 10 as the drum rotates therein, while the object of the successively closer spaced bars 25 and the inclined bottom of the chambers 20 is to cause a relatively large amount of plastic material or slurry to be accumulated adjacent the rib 24 while a relatively lesser amount of material will be accumulated at the outer ends of the chambers 20. However, to prevent the plastic material from being drawn through the spacing bars 25 there is provided a filtering cloth 40 covering the peripheral portion 17 of the drum and of a sufficient width to extend beyond the outer ends of the chambers 20, thereby to be supported by the drum periphery as indicated at 41. To properly position the filtering cloth on the drum periphery there is provided at each side of the drum a peripheral flange 42, preferably made of rubber, and inserted within a peripheral drum groove, while metallic peripheral bands 43 disposed on the outside of the flanges 42 prevent the latter from being forced out of shape. The filtering cloth may be of any suitable material, such as silk, linen, muslin, wire guaze or other perforated material.

Figures 3, 12:
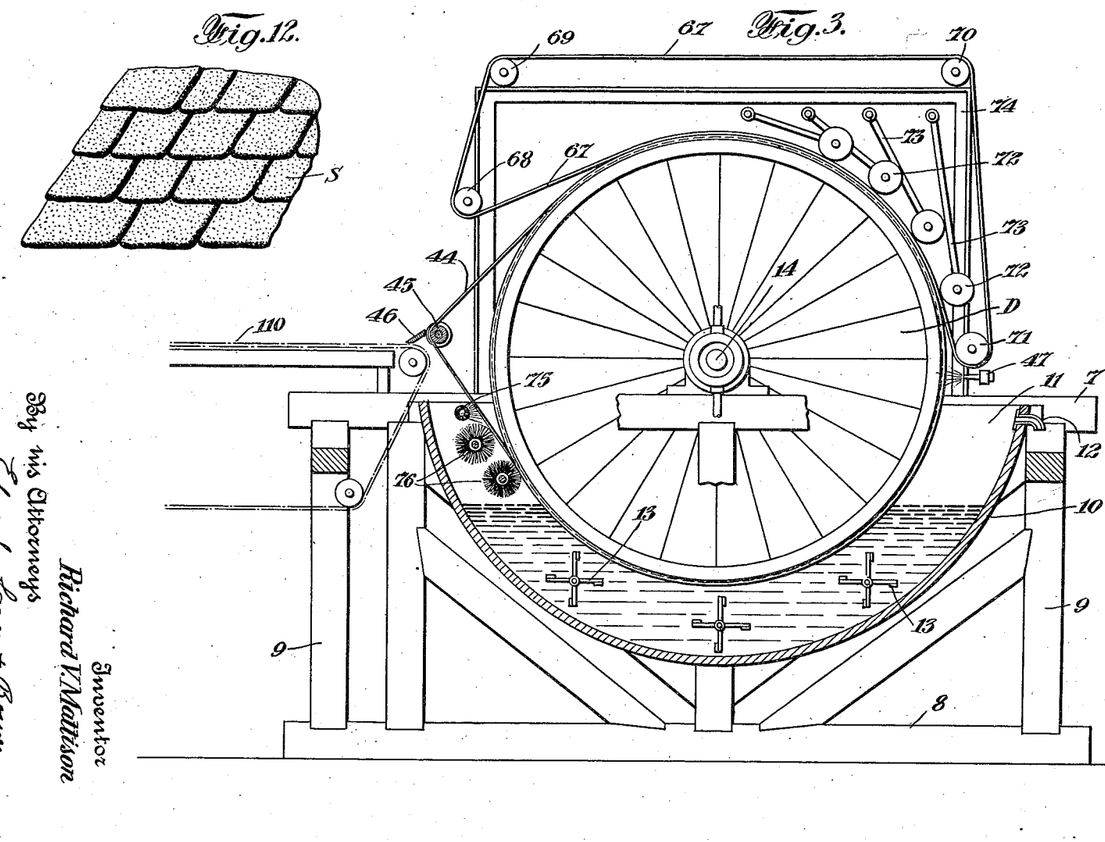
Fig. 3 is a vertical longitudinal section taken substantially on the line 3—3 of Fig. 2.
Fig. 12 is a view of a roof built up of shingles embodying my invention.

In order to aid in the forming of the plastic material into substantially desired shape and to aid in holding the articles to the periphery of the drum over the chambers 20 there is provided flexible molding cords 44, preferably made from fishing line or other similar material, which are supported in the form of endless belts by the drum periphery on top of the filtering cloth. These cords as shown in Figs. 3, 4 and 5 are successively spaced closer together as the outsides of the drum periphery are reached. The cords 44 lead off the drum periphery to spacing groove in roller 45. The grooved roller 45 may be supported in any suitable manner and it is clear that it might be adjustably supported to vary the tension of the cords.

In order to initially press the plastic shingles there is provided a belt 67 which engages an arcuate portion of the drum. This presser belt leads off of the drum on to a guiding roller 68 and over and under guiding rollers 69, 70 and 71 back on to the drum. This presser belt will have sufficient transverse flexibility so that the tapered sides of the articles will be properly engaged. If for any reason it should be desired, it is obvious that the presser strip could be made separately, one part to cover each set of the parallel chambers in the drum. In order to exert further pressure, rollers 72 are carried on one end of arms 73, the other ends of which are pivotally supported by a suitable framework 74. It will be noted that the length of the arms 73 diminishes as the upper rollers are reached, and it will also be clear that the periphery of these rolls could taper inwardly towards their central portion, thereby to conform to the tapered portions of the articles, or if desired, the rollers could be split at their central portion.

In order to clean the filtering cloth and cords and to provide the necessary fluid such as water for mixing the sand, fibres and cement to form the slurry there is provided within the tank 10 a transversely disposed fluid conducting pipe 75 which is provided with nozzle openings whereby liquid is directed against the periphery of the drum. The blast of fluid will drive out any plastic material lodged in the openings of the filtering cloth and on the cords, and by the cooperation of rotary brushes 76 this material will be entirely removed from the filtering cloth and cords. The material thus removed is recovered and remixed with the slurry in the tank 10.

Figures 2, 11:
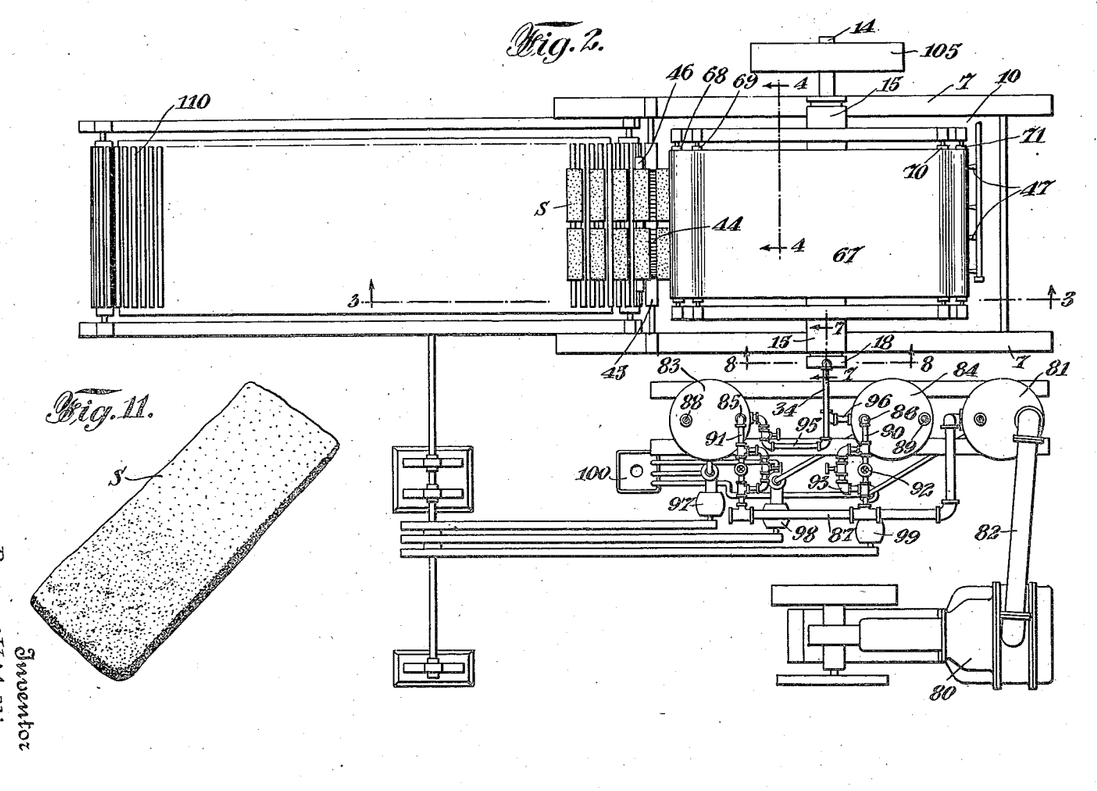
Fig. 2 is a plan view of Fig. 1.
Fig. 11 is one form of a shingle.

The mechanism for controlling the degree of vacuum in the chambers 31 and 32 comprises as shown in Figs. 1 and 2, a vacuum pump 80 of any suitable type, and which has communication with a tank 81 as by pipe 82. The tank 81 forms in effect a control tank for tanks 83 and 84, which have communication therewith as by pipes 85 and 86, leading into a main pipe 87, which in turn communicates with the tank 81. Suitable pressure control valve mechanisms 88 and 89 are carried by the tanks 83 and 84 respectively. It will be clear that these valve mechanisms could be used to control the degree of pressure within each tank in addition to the mechanism now to be described. The pipes have associated with their horizontal portions 90 and 91 identical control valve mechanisms, so that the description of one will suffice for both. An adjustable valve 92 may be used for throttling purposes, and by suitable adjustment any degree of vacuum could be obtained. A suitably valved by-pass 93 furnishes a further adjustment for a vacuum condition. The tank 83 has communication with the chamber 32 as by the pipe 34, which is a continuation of a valved controlled pipe 95, leading from the tank 83. The tank 84 has communication with the chamber 31 as by the pipe 33, and a suitably valved controlled pipe 96. As the vacuum in the various chambers 20 will cause water to be drawn from the plastic shingles suitable means is provided for draining this water, which will settle in the tanks 83, 84 and 81. This means comprises pumps 97, 98 and 99, communicating respectively with the tanks 83, 84 and 81 by suitable pipes, all of which are adapted to discharge into a suitable collecting pipe 100. The liquid so collected may be returned to the system, for such liquid would contain a large percentage of cement and other material.

The operation of the device so far described is as follows:

The filtering cloth 40 being secured to the periphery of the drum D will rotate therewith, being supported by the strips 25 and the partitions 21, 24 and the end surfaces 41, the chambers 20 being separated by the sealing strips 21ᵃ. The spaced cords are placed over the filtering cloth and are guided by the grooved roller 45, and are in unequally spaced position on the drum periphery. The dry sand, fibres and cement material is charged into the tank 10 and the drum D rotates by a suitable belt pulley 105, which is fixed to the drum shaft 14. At the same time the agitators 13 will be rotated to mix the sand, fibres and cement materials with the fluid from the pipe 75 and keep the slurry in a uniform condition. As the drum rotates those of the chambers or compartments 20 which are disposed within the slurry will be subjected to a minimum vacuum as by connection of the passages 29 with the minimum vacuum chamber 31. The chamber 31 communicates with the minimum vacuum tank 84 as by the pipes 93, 33, chamber 31, those of passages 29 which are in communication therewith and the pipes 27 and 26. This will cause the slurry or plastic material to be drawn against the filtering cloth 40, and cords 44 conforming to the shape of the chambers 20 which it will be remembered is suitably supported upon the series of cross bars 25. The thickness of the plastic material will be varied in accordance with the degree of vacuum, the successively closer spacing of the bars 25 and to the inclined bottoms of the chambers 20. It has been found that such a construction will cause a lesser amount of material to be held adjacent the relatively closer spaced bars 25 than will be held adjacent the widely spaced bars. By the vacuum the plastic material will be held very tightly against the filtering cloth and cords, which cords will have a tendency to be embedded in the undersurface of the article, thus aiding in maintaining the article on the periphery of the drum, as clearly shown in Figs. 4 and 5. As the portion of the drum submerged in the slurry is rotated therefrom in a counter clockwise direction, the chambers 20 will be subjected to a higher degree of vacuum due to the passages 29 coming into communication with the chamber 32. This permits the tank 83 to be placed in communication with each of the chambers as through pipes 95, 34, chamber 32, passage 29 and the pipes 27 and 26. The passages 29 rotate with the drum due to the connection of the member 28 with the hub 18, while the valve casing 30 remains stationary. With the chambers in the upper right hand portion being subjected to a higher vacuum it will be clear that water will be drawn from the plastic articles upon the drum, and this water will finally settle in the tanks 83, 84 and 81, from which it will be drawn as by the pumps 97, 98 and 99, and discharged into the collecting pipe 100. During the period that the articles are being subjected to the higher vacuum they will be in contact with the pressing belt 67, and by cooperation therewith of the series of rollers 72 even more water will be squeezed out than otherwise, and the upper surface of the article made uniform. As the drum continues to rotate the passages 29 will finally come into communication with the atmosphere, thereby permitting the removal of the formed articles from the drum. It will be noted that during this period the cords are gradually separated from the drum and filtering cloth, thereby causing the articles to be entirely supported by the cords. The result is that as the cords pass within the grooves of roller 45 they are stripped from the articles S by passing downwardly around the roller 45, this action being clearly shown in Fig. 3, the articles then being discharged upon a plate 46 which directs them to a suitable conveying mechanism to permit further operations to be performed thereon.

In the manufacture of some plastic articles such as shingles it may be desirable to provide a means for coloring or coating the article or a portion thereof. Coloring or coating spray guns 47 may be provided for spraying coloring or coating material to the articles as the drum rotates and when the articles on the drum are at a minimum vacuum. As the drum rotates and is subjected to a higher degree of vacuum due to the passages 29 coming into communication with the chamber 32 the coloring or coating material on the surface of the article will be drawn into the surface of the plastic article, creating a substantial thickness of coloring or coating surface.

Figure 9:
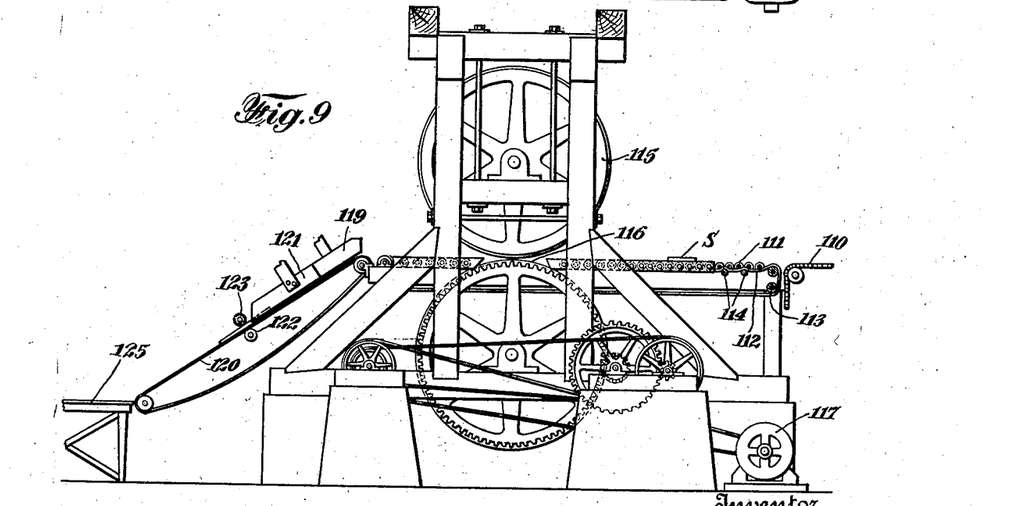
Fig. 9 is a side elevation of the pressing rollers and shingle scoring mechanism.

After discharging a plastic article from the cords it is further pressed and then the large or thickened end thereof is or may be scored, pitted or roughened. The means for accomplishing these ends comprises a plate 46 and an endless belt conveyor 110, suitably supported and disposed so as to receive the articles S from the cords. The conveyor 110 could be driven by any suitable means and is adapted to discharge upon a conveyor 111 of the final pressing mechanism. As shown in Fig. 9, the conveyor 111 comprises a series of relatively small rollers beneath which and in contact with is a belt 112, which passes over guiding rollers 113, and is held in frictional contact with the rollers as by holding rollers 114. When the belt 112 is driven in a clockwise direction, the rollers 111 will be rotated so as to convey the plates or shingles between a pair of cooperating press rollers 115 and 116. These rollers may be supported in any suitable manner, such as a wooden framework or the like. The upper surface of the rollers 111 will be substantially tangent to the surface of the lower roll 116, these rollers being spaced apart adjacent the pressing rolls so as to allow the latter to have full pressing contact with both sides of the articles. The periphery of the rolls is tapered with the narrower portion in the center, thereby allowing the large end of the tapered article to pass between the rollers, as shown in dotted lines in Fig. 10. The upper roller is also adjustable by any suitable means in order to press shingles or other articles of different thicknesses. The lower roller is driven by any suitable means, which herein is shown as a motor 117 and suitable driving gearing 118 for connecting the motor and roller 116.

Figure 10:
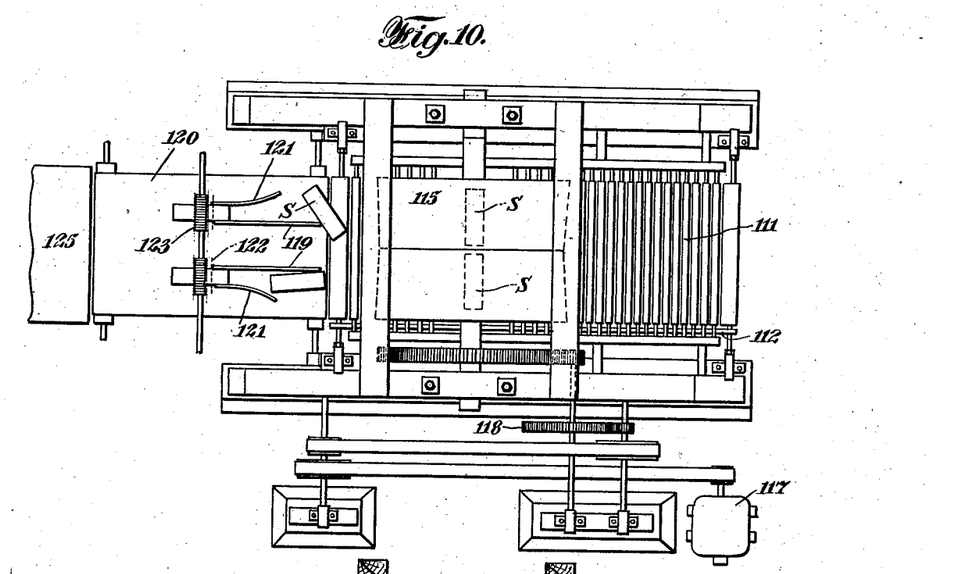
Fig. 10 is a plan view thereof.

After the articles have passed through the pressing rollers it is sometimes desired to score the upper surface thereof, although both surfaces could be scored if desired, and to accomplish this the articles are first turned so that their longitudinal axes will be parallel with the direction of travel. The means for turning the articles from the transverse position as shown in Fig. 10 to the longitudinal position comprises a pair of guiding abutment walls 119, which lie over a conveyor belt 120, and terminate adjacent the end of the roller conveyor 111. A pair of secondary flared guiding walls 121 terminate somewhat short of the extended ends of the walls 119, thereby permitting the articles S as they come from the conveyor 111 to engage the extended ends of the walls 119 at a point offset from the center of gravity of the article, and upon continued movement of the article due to the conveyor 111, the outer end of the article will be swung around on to the conveyor 120 until it is substantially in alignment with the space between the walls 119 and 121, whereby it will be carried forwardly on the conveyor 120 and properly guided between a scoring mechanism.

The scoring mechanism comprises a roller 122 for supporting the articles as they are run under scoring rollers 123. The scoring rollers might have any suitable design formed on their periphery so as to mark the upper side of the large end of a tapered shingle accordingly, but the rollers are specifically shown as provided with a series of peripheral V-shaped grooves. The rollers 123 are suitably spaced from the supporting rollers 122 so that only a portion of the upper surface of the article will be scored. After passing through the scoring mechanism the articles may be discharged from the belt 122 on to any suitable device 125. Instead of turning the shingles prior to marking thereof they may be fed through the scoring mechanism in a transverse position thereby transversely marking the shingles. If a longitudinal marking is desired without turning the shingle the scoring roller could have its periphery provided with axially extending grooves.

While I have specifically shown a drum with which the filtering cloth and cords may cooperate, it will be clear that the cloth and cords might be made to pass in a flat plane, in which position a flat conveyor belt could be used for supporting the cloth and cords and that other or modified apparatus could be used to produce the shingle.

By applying this invention to artificial slate or shingle manufacture it is noted that by tapering the slate or shingle, material is saved in addition to providing a slate or shingle made from plastic material which has all of the requisite structural qualities. It is also apparent from the general principles employed in my machine that the shingle edges could be made irregular, so as to give the effect that the slate or shingle had been shaped merely by chipping off with a hammer, such as is done with certain types of quarried natural slates or shingles. As shown in Fig. 11 the upper exposed surface could be given a desired irregular shape. This surface could also be given the effect as though having been chipped simply by suitably designing the periphery of either the scoring or pressing rolls. Obviously, if desired a straight reciprocating type of press might be used. Even though the shingle be provided with a highly irregular or roughened surface, still they may be laid without any trouble due to the thin end of the slate or shingle being smooth as is also preferably the lower surface of the large end. However, if desired the lower slate or shingle surface adjacent only the edges of the large end may be given this chipped appearance, thereby leaving the remaining under surface flat so as to facilitate laying of the tapered slates or shingles.

The method of this invention is especially adaptable to the production of the slates, slabs or shingles having the composition above set forth. More specifically, the proportions of the respective elements are asbestos fibre about ⅜" long 5%, asbestos short fibre 20%, sand 30%, and cement 45%, but preferably for thin or very thin plates, clean asbestos fibre from about ⅛" to ⅜" long 15%, sand containing not less than 95% of free silicon dioxide ($SiO_2$) 30%, and Portland or hydraulic cement 55%. The suction draws the slurry against the filtering cloth and collects it there, and the continued suction tends to draw the lighter more fluid elements of the slurry inwardly through the mass so as to make it more compact and solid, and to stop up any open pores. The resulting slates or shingles, while conforming in general outline to each other, will differ in details of surfacing so that no two slates or shingles will be exactly alike. The suction effect at the surface, depending at every point on the accumulation and matting of the material beneath can be made when desired to give a widely variable roughened appearance to the surface. The thickness and taper may be readily varied by altering the amount and distribution of the suction. By making the edges of the suction chambers irregular where they contact with the filtering cloth or belt 40, the edges of the shingle will be correspondingly increased in irregularity to any desired extent, to give, for instance, the effect of edges hand-chipped by a hammer as with some types of quarried natural slates or shingles. A similar effect could be produced by suitably forming the periphery of either the scoring or pressing rolls. The roughness of the upper exposed surface of the shingle may be made more irregular by an irregular formation of the supporting means beneath the filtering cloth, resulting in a variable suction effect across the slate or shingle with corresponding local areas of thinness or depression.

The slates, slabs or shingles are composed of a wearing, weather-proof composition consisting of sand, as above described, cement and fibres. The fibres are embedded throughout the composition and are matted and entangled by the suction action and subsequent pressing so as to be substantially parallel to the surface of the slate or shingle. The parallel formation of the fibres through the slate or shingle strengthens the product and also aids in combining the sand and cement, as above described, into a strong homogeneous mass.

This application is a division of my copending application, Serial No. 92,730, filed March 6, 1926, Plastic article and method and apparatus for making the same.

I claim:

1. As an article of manufacture, a tapered plate consisting of a solid homogeneous mass of colloided cement such as Portland cement deposited and set together to form the entire thickness of the plate, and fibres distributed throughout the set cement, said fibres being matted by deposit with the cement in such manner that the fibres are generally parallel to the plane of said article to strengthen the plate against transverse stresses.

2. As an article of manufacture, a tapered plate consisting of a solid homogeneous mass of colloided cement such as Portland cement with an inert filler deposited and set together to form the entire thickness of the plate, and fibres distributed throughout the set cement and filler, said fibres being matted by deposit with the cement and filler in such manner that the fibres are generally parallel to the plane of said article to strengthen the plate against transverse stresses.

3. As an article of manufacture, a tapered plate consisting of a solid homogeneous mass of colloided cement such as Portland cement with sand deposited and set together to form the entire thickness of the plate and fibres distributed throughout the set cement and sand, said fibres being matted by deposit with the cement and sand in such manner that the fibres are generally parallel to the plane of said article to strengthen the plate against transverse stresses.

4. As an article of manufacture a plate comprising a body portion of cement, sand and fibres, said plate having a greater compactness of cement, sand and fibres toward its under surface as the lighter particles of cement, sand and fibres are drawn inwardly toward the under surface in the manufacture of said plate.

5. As an article of manufacture a plate comprising a body portion of cement, sand and fibres, said fibres running generally parallel to the plane of said plate, said plate having a greater compactness of sand, cement and fibres, toward its under surface as the lighter particles of sand, cement and fibres are drawn inwardly toward the under surface in the manufacture of said plate.

6. As an article of manufacture a plate consisting of a solid homogeneous mass of hydraulic cement with a granular filling material deposited and set together to form the entire thickness of the plate, and fibres distributed throughout the set cement and filling material, said fibres being matted by deposit with the cement and material in such manner that the fibres are generally parallel to the plane of the plate whereby it is strengthened against transverse stresses.

7. As an article of manufacture a plate consisting of a homogeneous mass of colloided cement deposited and set to form the entire thickness of the plate, and fibres distributed throughout the set cement, said fibres being matted by deposit with the cement in the course of manufacture whereby they are disposed in general parallelism with the plane of the plate, strengthening it against transverse stresses.

8. As an article of manufacture, a plate comprising a body portion of cement, sand and fibers, said plate being more compact towards its under side as the lighter particles of cement, sand and fibres are drawn inward toward the under surface in manufacture, and having a substantial depth of coloring material at its upper, less-compact side, said coloring material extending inward from the upper surface of the plate.

RICHARD V. MATTISON.